US011166785B2

(12) United States Patent
Niedermeier (10) Patent No.: US 11,166,785 B2
(45) Date of Patent: Nov. 9, 2021

(54) BALL BEARING CONSTRUCTION WITH TILT COMPENSATION (71) Applicant: Gebruder Reinfurt GmbH & Co. KG, Rimpar (DE)

(72) Inventor: Herbert Niedermeier, Poppenhausen (DE)

(73) Assignee: GEBRUDER REINFURT GMBH & CO. KG, Rimpar (DE)

( * ) Notice: Subject to any disclaimer, the term of this patent is extended or adjusted under 35 U.S.C. 154(b) by 822 days.

(21) Appl. No.: 15/761,990

(22) PCT Filed: Sep. 20, 2016

(86) PCT No.: PCT/EP2016/001572
§ 371 (c)(1),
(2) Date: Mar. 21, 2018

(87) PCT Pub. No.: WO2017/050426
PCT Pub. Date: Mar. 30, 2017

(65) Prior Publication Data
US 2018/0256290 A1 Sep. 13, 2018

(30) Foreign Application Priority Data

Sep. 22, 2015 (DE) .......................... 102015012332.7

(51) Int. Cl.
*F16C 19/06* (2006.01)
*F16C 33/58* (2006.01)
(Continued)

(52) U.S. Cl.
CPC ............. *A61C 1/181* (2013.01); *A61C 1/05* (2013.01); *F16C 19/06* (2013.01); *F16C 19/163* (2013.01);
(Continued)

(58) Field of Classification Search
CPC ...... F16C 19/06; F16C 19/163; F16C 33/583; F16C 33/585; F16C 2240/70;
(Continued)

(56) References Cited

U.S. PATENT DOCUMENTS 3,370,899 A * 2/1968 Eklund .................. F16C 19/06
384/516
4,249,896 A 2/1981 Kerfoot
(Continued)

FOREIGN PATENT DOCUMENTS

DE 2454079 A1 5/1975
DE 102005021268 C5 12/2005
(Continued)

OTHER PUBLICATIONS

Office Action dated Jul. 8, 2020 in corresponding JP Application 2018-513380, with English Language Translation.
(Continued)

*Primary Examiner* — Marcus Charles
(74) *Attorney, Agent, or Firm* — NovoTechIP International PLLC (57) ABSTRACT A dental handpiece and method of turbine support therein, comprises a turbine wheel having a rotor shaft rotatably supported by a housing via ball bearings, and configured to rotationally drive a clamping chuck, at least one of the ball bearings including, an inner ring arranged on the rotor shaft, the inner ring having a raceway, an outer ring, having an outer raceway movably supported by the housing, and balls arranged between and guided by the inner and outer raceways. The raceway of the inner ring, in cross section, has a concave shape with a curvature corresponding to a radius of the balls. Optionally, the raceway of the outer ring in cross section, has, in a central area, a first curvature with a first radius and, adjoining the central area, a second curvature
(Continued)

with a second radius, the first radius being smaller than the second. Optionally, the raceway of the outer ring has a substantially parabolic profile.

5 Claims, 6 Drawing Sheets

(51) Int. Cl.
| | | |
|---|---|---|
| | *A61C 1/05* | (2006.01) |
| | *A61C 1/18* | (2006.01) |
| | *A61C 1/08* | (2006.01) |
| | *F16C 19/16* | (2006.01) |

(52) U.S. Cl.
CPC ........ *F16C 33/585* (2013.01); *F16C 2240/70* (2013.01); *F16C 2240/76* (2013.01); *F16C 2316/13* (2013.01)

(58) Field of Classification Search
CPC .... F16C 2240/76; F16C 2316/13; A61C 1/05; A61C 1/08; A61C 1/181
USPC ................... 384/91, 417, 450, 490, 516–517
See application file for complete search history.

(56) References Cited

U.S. PATENT DOCUMENTS

| | | | | |
|---|---|---|---|---|
| 4,664,535 A * | 5/1987 | Mottate | ............... | F16C 29/0647 384/55 |
| 6,196,720 B1 | 3/2001 | Nozaki | | |
| 7,448,806 B2 * | 11/2008 | Ishiguro | ............... | F04B 27/0895 384/417 |
| 8,257,210 B2 * | 9/2012 | Fujiwara | ................. | F16D 15/00 474/74 |
| 8,858,086 B2 * | 10/2014 | Murata | ............... | F16C 33/6696 384/462 |
| 2001/0028754 A1 | 10/2001 | Ishiguro | | |
| 2007/0059664 A1 * | 3/2007 | Novak | .................. | F16C 27/066 433/131 |

FOREIGN PATENT DOCUMENTS

| | | | | |
|---|---|---|---|---|
| DE | 102007005007 A1 | | 8/2008 | |
| DE | 102007024253 A1 | | 11/2008 | |
| DE | 102012205275 A1 * | | 10/2013 | ............. F16C 33/784 |
| DE | 102013204325 A1 * | | 9/2014 | .............. F16C 33/64 |
| EP | 0010371 A1 | | 4/1980 | |
| EP | 2657555 A2 * | | 10/2013 | ............ F16C 19/166 |
| JP | 62-107813 S | | 7/1987 | |
| JP | H09177795 A | | 7/1997 | |
| JP | 2001208080 A | | 8/2001 | |
| JP | 2005042892 A | | 2/2005 | |

OTHER PUBLICATIONS

International Search Report and Written Opinion dated Nov. 9, 2016 by the International Searching Authority (European Patent Office) in PCT Application PCT/EP2016/001572.

Office Action dated Apr. 26, 2020 in corresponding CN Application 201680053521.0, with English Language Summary.

* cited by examiner

Prior art

Fig. 2b

Prior art

Fig. 2c

Prior art

Fig. 3

Prior art

BALL BEARING CONSTRUCTION WITH TILT COMPENSATION

CROSS REFERENCE TO RELATED APPLICATIONS

The present application claims priority under 35 U.S.C. 371 to PCT/EP2016/001572, filed Sep. 20, 2016, the contents of which are incorporated by reference in their entirety.

FIELD OF THE INVENTION

The present invention relates to a dental handpiece for rotationally driving a rotary dental tool for dental treatment, as well as to a ball bearing for a floating installation mounting and to the use of a ball bearing for the rotary support of a turbine in a dental handpiece.

BACKGROUND OF THE INVENTION

Dental handpieces have gas-operated turbines for driving a dental tool, such as a drill, for dental treatment. The gas-operated turbine provided in the dental handpiece runs at speeds of approximately three hundred thousand to five hundred thousand revolutions per minute. At such high rotational speeds, even minimal imbalances cause considerable vibrations and noise, which impair the function and durability of the turbine and also have negative effects for the dentist and the patients.

Noise and vibrations of the turbine must therefore be damped. U.S. Pat. No. 4,249,896 proposes a turbine mounting having a pair of bearing assemblies, wherein an outer ring of the bearing is supported via a single elastic ring, such as an O-ring produced from neoprene. The elastic ring provides a radial support of the turbine within the housing of the handpiece and dampens the transmission of vibrations from the turbine to the handpiece during use of the handpiece.

Such an installation situation of a ball bearing is very unusual, because, for example, radial deep groove ball bearings and angular ball bearings have very precise installation conditions in most technical applications, in which the layout of the bearing points is defined in fixed and floating bearing positions. The bearing points are produced very precisely here, so that tilting of the bearing points, such as via an inclined shaft, can be excluded in most cases.

The outer rings of the fixed and floating bearing are arranged in a precision housing with a tolerance of a few micrometers and fixed in the housing by means of a sliding, transition or press fit. In such an installation situation, radial deep groove ball bearings according to the prior art with a defined raceway diameter on the inner and outer rings can achieve outstanding results with regard to rotational speed suitability, load-bearing capacity and service life.

In the described application of a radial deep groove ball bearing in a dental handpiece according to U.S. Pat. No. 4,249,896, such a precise installation situation is not present, because the outer ring is supported via the elastic element and can thus tilt. In other words, both bearing points are designed as floating bearings and the deep groove ball bearing can fail very quickly due to the tilting. In addition, the lubricant that is introduced into the ball bearing in the form of oil or grease is transported to the outside very quickly by the exhaust air of the turbine, so that the ball bearings experience a deficient lubrication situation in a short time.

Due to the imprecise installation situation, an incline of the outer ring can occur already during the assembly of the ball bearing and, furthermore, the rotor shaft of the turbine tilts under the influence of an external radial load, which is applied to the outer end of the dental tool during the dental treatment. As a rule, this leads to a tilting of the inner ring to the outer ring of the ball bearing used, which may be in the form of a radial deep groove ball bearing or angular ball bearing, so that the balls of the ball bearing no longer move on a circular path but on an elliptical path during operation. Movement on an elliptical path instead of a circular path, however, leads to permanent changes in speed of the balls, i.e. to very abrupt acceleration and braking processes of the balls, which are transmitted to the ball bearing cage, which ultimately leads to greater vibrations and alternating stresses, which result in high wear of the ball bearing cage, so that these ball bearings can fail already after a short running time.

It was also considered to use a self-aligning ball bearing according to DIN 630, a spherical roller bearing according to DIN 635-1, or a self-aligning roller bearing according to DIN 635-2 for the floating installation mounting of the ball bearing, because these types of rolling bearings can tolerate certain tilts. For example, the self-aligning ball bearing has two rows of balls and the ball raceway of the outer ring has a hollow spherical shape. Due to the two-row design of such rolling bearers, however, these bearings have a larger dimension and are in particular not suitable for high rotational speeds as they occur in a dental handpiece, which are in the range from three hundred thousand to five hundred thousand revolutions.

BRIEF SUMMARY OF THE INVENTION

There is thus a need for an improved dental handpiece, which on the one hand can damp vibrations of the drive turbine well and on the other hand has a long service life and causes low noise.

This object is achieved by the features of the independent claims. Advantageous embodiments are defined in the dependent claims.

According to a first aspect, there is provided a dental handpiece for rotationally driving a rotary dental tool having the following components:

a housing having a handle and a chuck for receiving the dental tool, a turbine, drivable by compressed gas, having a turbine wheel and a rotor shaft, wherein the rotor shaft is connected to the chuck to rotationally drive the chuck, at least one ball bearing in the form of a radial deep groove ball bearing or an angular ball bearing with a plurality of balls, inner ring, outer ring and ball bearing cage, wherein the ball bearing rotationally supports the rotor shaft, wherein the inner ring of the ball bearing is arranged on the rotor shaft and the outer ring of the ball bearing is supported in the housing via an elastic element in order to damp vibrations, wherein the outer ring and the inner ring each have a raceway for guiding the balls, wherein the raceway of the inner ring, seen in cross section, has a concave shape with a constant curvature, the radius of which is slightly larger than the radius of the balls and thus substantially corresponds to the radius of the balls, wherein the raceway of the outer ring, also seen in cross section, in a central area has a first curvature having a first radius and in at least one area adjoining the central area has a second curvature having a second radius, and wherein the first radius is smaller than the second radius, or the raceway of the outer ring, seen in cross section, has a substantially parabolic profile.

By the outer rings of the radial deep groove ball bearings or angular ball bearings, hereinafter also referred to only as ball bearings, being supported via the elastic element in the housing, vibrations are hardly transferred to the handpiece, so that the dentist can operate the dental handpiece in a pleasant way and it also pleasant for the patient. In addition, noise is reduced to a minimum via the elastic element.

Angular ball bearings are to be understood to be ball bearings in which either the inner ring or the outer ring is formed with only one shoulder.

On the other hand, adverse effects on the ball bearing due to tilting are minimized due to the balls in the outer rings being allowed to run into the area of the second curvature with the second radius in the event of a tilt. This has the result that the elliptical shape of the raceway of the balls thus produced is reduced compared to the prior art. Thus, occurring acceleration and braking forces transmitted to the ball bearing cage from the balls are reduced. In other words, the contact angle decreases when the ball runs into the area of the second curvature with the second radius, so that the elliptical shape is less pronounced and lower accelerations and decelerations occur than if the ball continued to run on the first curvature with the first (smaller) radius in the event of a tilt. As a result, vibrations are damped even better and wear of the ball bearings can also be influenced positively.

Preferably, a tangent applied to the first curvature at a boundary point between the first curvature and the second curvature is located substantially on a tangent applied to the second curvature at the boundary point. By the tangents of the first and the second curvatures having the same slope at the boundary point between the two curvatures, a smooth transition or an undisturbed transition of the balls from the first to the second curvature and in the opposite direction can be ensured.

If the raceway of the outer ring, seen in cross section, has a parabolic profile, it is selfevident that the vertex of the parabola is congruent with the lowest point of the raceway, seen in cross section, i.e. that the vertex of the parabola and the lowest point of the raceway are located on a common point.

Further preferably, by the second radius being considerably larger than the first radius, preferably about 50% to 100% larger, even better about 70% to 80% larger, in the event of tilting of the bearing points of the ball bearing or relative tilting between the inner ring and the outer ring of the ball bearing, the raceway of the balls during operation of the ball bearing can be approximated even better to a circular path from the resulting elliptical path or the occurrence of the elliptical path can be reduced.

Preferably, the elastic element is an O-ring. Further preferably, the outer ring is axially biased by a wave spring washer. As a result of the installation of the ball bearings via the O-ring as an elastic element in conjunction with the wave spring washer, the outer ring is elastically supported both in the radial and axial directions and can damp vibrations very well and avoid a transfer of vibrations to the handpiece as far as possible. In addition, tilting can also be reduced if the materials and designs of O-ring and wave spring washer are selected suitably.

Preferably, the first curvature extends over an angular range of about 8° to about 15°.

Further preferably, two ball bearings are provided, wherein both ball bearings are installed as floating bearings.

According to a further aspect, there is provided a ball bearing in the form of a radial deep groove ball bearing or an angular ball bearing for a floating installation mounting of an outer ring, in particular for a dental handpiece, with the following components:

an inner ring and an outer ring and a plurality of balls arranged therebetween, wherein the outer ring and the inner ring each have a raceway for guiding the balls, wherein the raceway of the inner ring, seen in cross section, has a concave shape with a constant curvature, the radius of which is slightly larger than the radius of the balls and thus substantially corresponds to the radius of the balls, wherein the raceway of the outer ring, also seen in cross section, in a central area has a first curvature having a first radius and in at least one area adjoining the central area has a second curvature having a second radius, and wherein the first radius is smaller than the second radius, or the raceway of the outer ring, seen in cross section, has a substantially parabolic profile.

A floating installation mounting of the outer ring is understood to be an elastic support of the outer ring in the radial and/or axial direction, in contrast to a conventional installation situation, in which bearing rings of a rolling bearing are installed by means of a sliding, transition or press fit. In other words, a certain minimum movement of the outer ring in the installed state is possible in order not to transmit vibrations due to imbalances to a housing.

The balls are preferably guided by a ball bearing cage. The cage can be designed either as an inner ring-guided ball bearing cage, an outer ring-guided ball bearing cage or a ball-guided ball bearing cage. However, the invention is also applicable to full complement ball bearings without ball bearing cage.

The second radius is preferably about 50% to about 100% larger than the first radius.

The first curvature advantageously extends over an angular range of about 8° to about 15°.

According to a further aspect, the invention relates to a use of a ball bearing in the form of a radial deep groove ball bearing or an angular ball bearing as a bearing for the rotary support of a turbine in a dental handpiece having an inner ring, the raceway of which, seen in cross section, has a first curvature with a radius, and an outer ring, the raceway of which, likewise seen in cross section, has the first curvature with the radius in a central area and has a second curvature with a second radius in at least an area adjoining the central area, wherein the first radius is smaller than the second radius, or the raceway of the outer ring, seen in cross section, has a substantially parabolic profile.

Also in this case, it is true that if the raceway of the outer ring, seen in cross-section, has a parabolic profile, the vertex of the parabola is congruent connected with the lowest point of the raceway, seen in cross section, i.e. that the vertex of the parabola and the lowest point of the raceway are located on a common point.

DETAILED DESCRIPTION OF THE INVENTION

The invention will now be explained in more detail on the basis of an embodiment with reference to the attached drawings, in which:

FIGS. 2a to 2c show cross sections through ball bearings according to the prior art in the untilted state, wherein FIG. 2a illustrates a radial deep groove ball bearing, while FIG. 2b illustrates an angular ball bearing, in which the inner ring is formed with only one shoulder, and FIG. 2c illustrates a further angular ball bearing, in which the outer ring is formed with only one shoulder.

Figure 1:
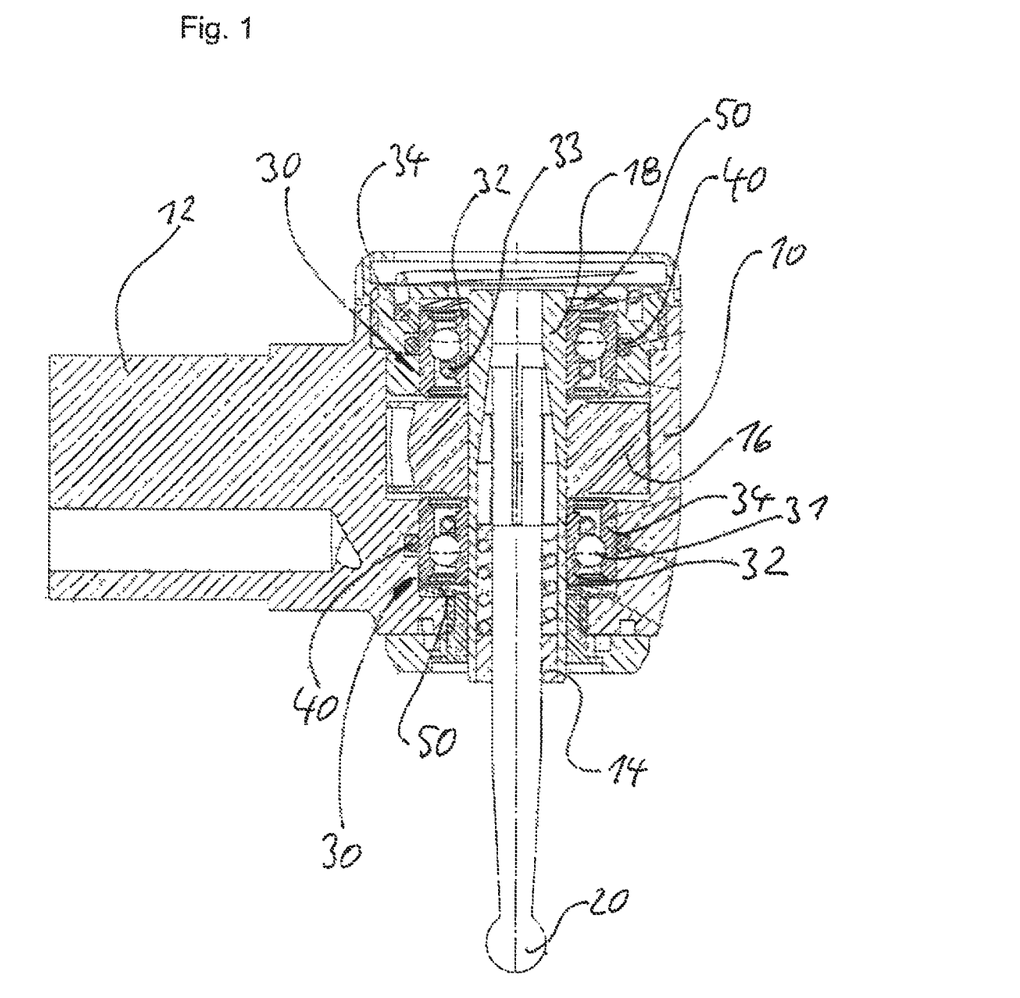
FIG. 1 shows a cross section through a dental handpiece with a dental tool inserted therein.

As is shown in FIG. 1, a dental handpiece has a handle 12 and a housing 10, at a distal end of the handle 12, for receiving a chuck 14 and a turbine wheel 16. A rotor shaft 18 is connected both to the turbine wheel 16 and to the chuck 14, so that a rotation of the turbine wheel 16 is transmitted to the chuck 14 via the rotor shaft 18. In other words, the turbine wheel 16, the rotor shaft 18 and the chuck 14 rotate together.

A dental tool 20, for example a drill, can be inserted into the chuck 14, so that the dental tool 20 can rotate together with the chuck 14, when the turbine wheel 16 is set in rotation by compressed gas, such as compressed air.

The rotor shaft 18 is rotationally supported in the housing 10 of the dental handpiece via two ball bearings 30. Each of the ball bearings 30 has a plurality of balls 31 that are guided by means of a ball bearing cage 33. The rotor shaft 18 is inserted into the inner rings 32 of the ball bearings 30, for example by means of a press fit or by means of a sliding fit and simultaneous adhesive bonding of the inner rings 32 to the rotor shaft 18. In contrast to this, the outer rings 34 of the ball bearings 30 are elastically supported in the housing 10 by the elastic elements 40, such as O-rings, being arranged in corresponding recesses of the housing 10.

In this way, the outer rings 34 are not rigidly fixed in the housing 10, but can move in the housing 10 to a certain extent and thus also tilt. In addition, the outer rings 34 are each axially resiliently biased via a wave spring washer 50 and can also compensate for or perform axial movements due to the elasticity of the wave spring washer 50, which can reinforce the tilting of the outer rings 34. Due to the installation situation of the rotor shaft 18 in the inner rings 32, they can tilt as well.

Thus, the entire rotary assembly consisting of the two ball bearings 30, the rotor shaft 18, of the turbine wheel 16 and the chuck 14 in supported elastically in the housing 10 via the elastic element 40 and the wave spring washer 50. This elastic support of the rotary assembly can damp vibrations in an excellent manner, so that impairments due to vibrations can be reduced to a minimum both for the dentist and for the patient.

Although FIG. 1 shows the support of the outer rings 34 via the two elastic elements 40 in conjunction with the two wave spring washers 50, also two elastic elements 40 can be arranged on the outer rings 34 in conjunction with only one wave spring washer 50. Alternatively, only the two elastic elements 40 can be arranged and the wave spring washers 50 can be dispensed with. If one or both wave spring washers are dispensed with, the elastic element(s) 40 at the same time serve(s) as a radial damping element and as an axial biasing member by arranging the elastic element(s) 40 in such a way that they can also receive axial forces. In this case, the outer ring(s) 34 is/are provided with a recess in the form of a step at the outer circumference.

Figure 2A:
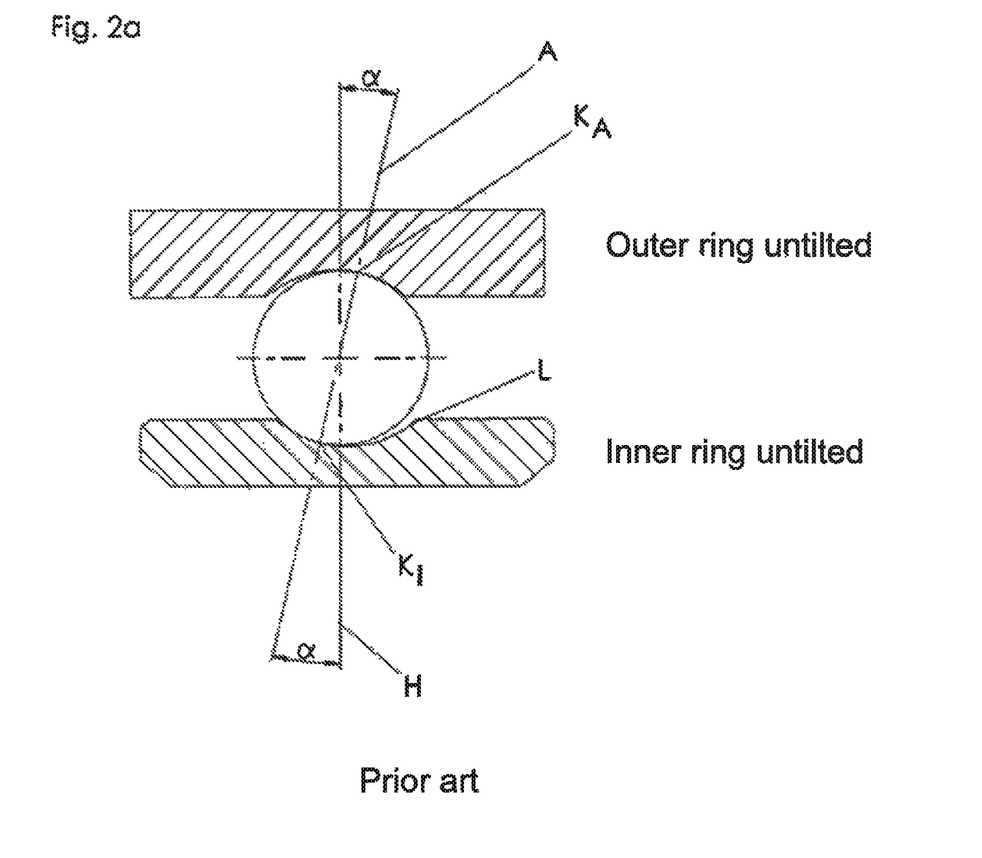

FIG. 2a shows the cross section through a portion of a ball bearing in the form of a radial deep groove ball bearing with untilted inner and outer rings. In ball bearings or deep groove ball bearings, the raceways L of the inner and outer rings have, seen in cross-section, an identical or uniform radius of curvature, seen over the entire cross section of the raceways L, which is slightly larger than that of the ball. In addition, prior to their installation, such ball bearings have a so-called radial clearance, i.e., seen in cross section, a small distance between the outer circumference of the balls with respect to the raceways L of the inner and outer rings in order to not clamp the balls between the inner ring and the outer ring. After the installation of the ball bearings, therefore, once again seen in cross section, the inner and outer rings must be displaced relative to one another in the horizontal direction (the so-called setting of a ball bearing) in order to enable the balls to rest against the raceways L of the inner and outer rings. The points at which the balls then rest are referred to as contact points.

An axis H extending vertically when seen in cross section, as shown in FIG. 2a, is perpendicular to the axis of rotation (not shown) of the ball bearing before the ball bearing is positioned and runs through the center of the ball and, seen in cross section, the lowest or deepest points of the raceways L of the inner and outer rings.

As a result of the required setting of the ball bearing and the associated mutual horizontal displacement of the outer ring relative to the inner ring, seen in cross section, the theoretical contact points of the ball originally, i.e. prior to the installation of the ball bearing, located at the lowest point of the raceways are displaced. Due to this displacement, the contact points thus migrate to an axis A, which is offset by an angle $\alpha$ relative to the axis H. The axis H remains vertically and running through the center of the ball after the setting. In FIG. 2a, the newly resulting contact points are designed with $K_A$ (contact point on the outer ring) and $K_I$ (contact point on the inner ring). In other words, when seen in the cross section illustrated, an offset of the theoretical contact points located at the lowest point of the raceways with respect to the contact points $K_A$ and $K_I$ now located on the axis A results, which can also be referred to as a pressure angle $\alpha$ between the axes H and A.

With the described offset, i.e. even if the contact points $K_A$ and $K_I$ have the pressure angle $\alpha$ with respect to the vertical axis H, the balls of the ball bearing during operation also run on a circular path that does not excessively wear the ball bearing, which can also be referred to as a circular path, as long as the inner ring and the outer ring do not tilt relative to each or do not mutually tilt.

Figure 2B:
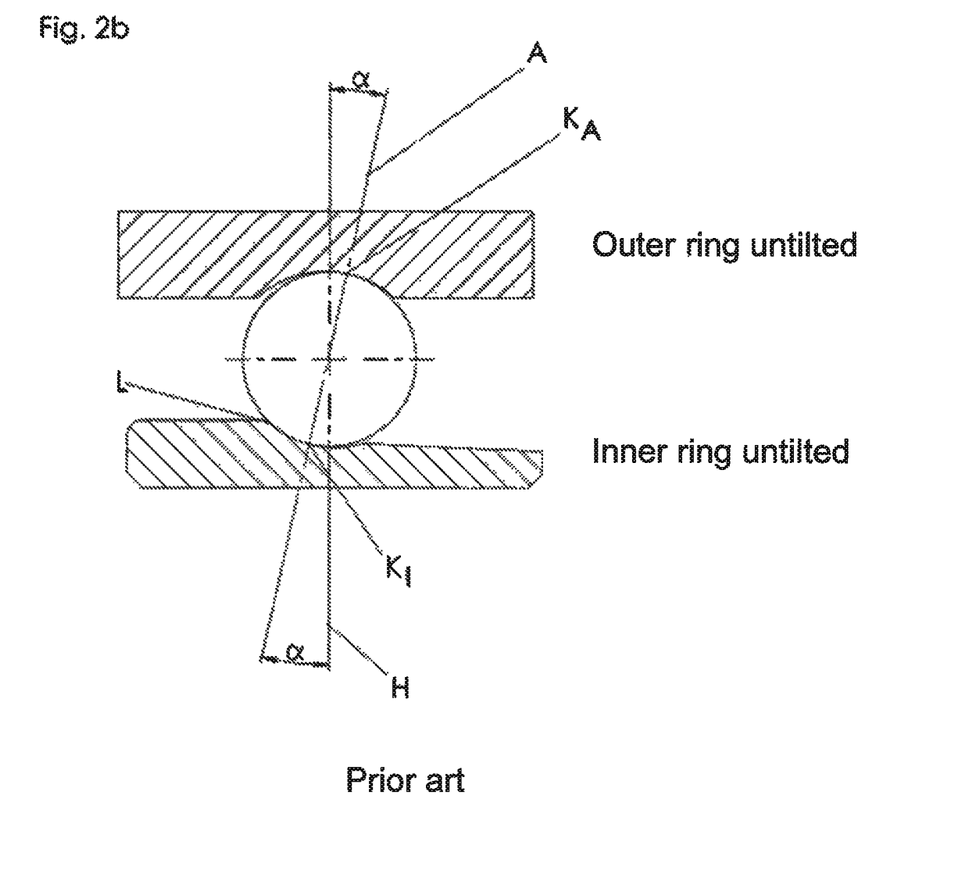

FIG. 2b shows, analogously to FIG. 2a, an angular ball bearing, in which the outer ring is identical to the outer ring of the radial deep groove ball bearing of FIG. 2a and is therefore not explained in more detail here. In contrast to the radial deep groove ball bearing shown in FIG. 2a, the angular ball bearing of FIG. 2b, however, has an inner ring with only one shoulder, i.e. the concave raceway or groove is not symmetrical, but has a shoulder on only one side, while the opposite side is substantially flat, i.e. substantially horizontally or slightly conically in the section shown.

Figure 2C:
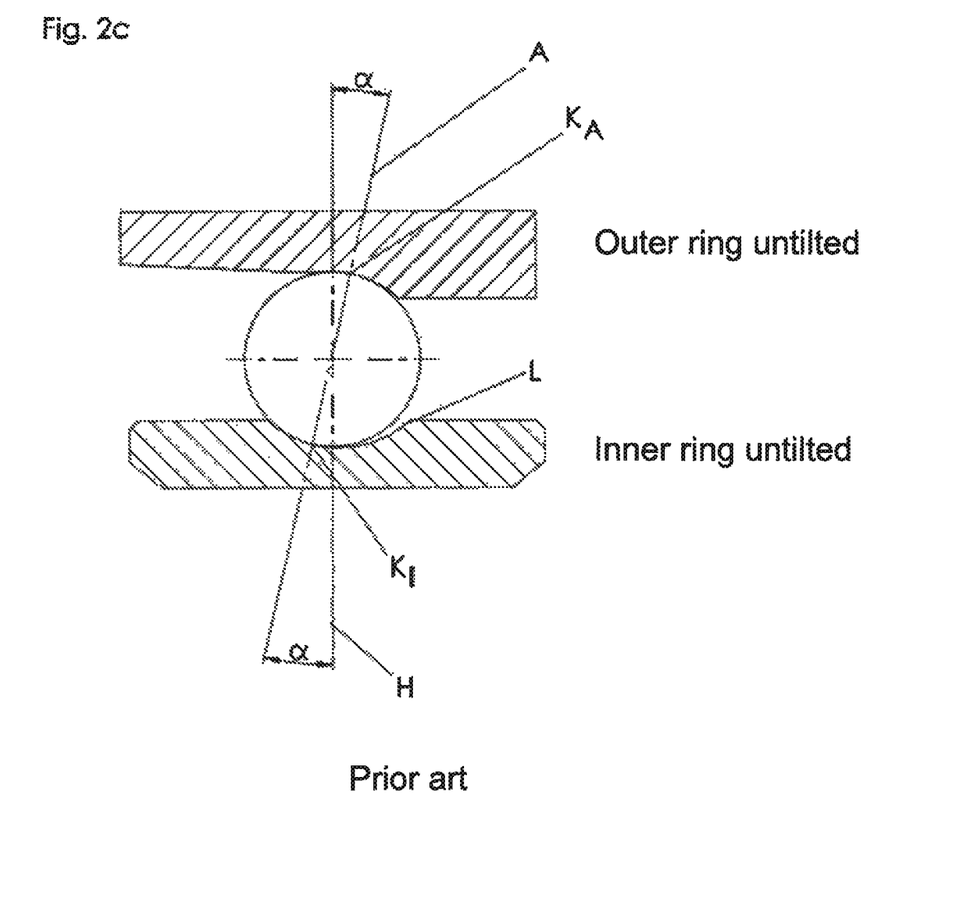

Moreover, FIG. 2c shows an angular ball bearing comprising a symmetrical inner ring and an outer ring, which has only one shoulder.

Due to the elastic support of the outer ring in the housing 10, a relative tilting of the outer ring relative to the inner ring may occur. This is to be explained in more detail on the basis of the following model calculation, wherein firstly the tilting of a ball bearing according to the prior art is examined (FIG. 3) and then compared to a tilting of a ball bearing according to the invention (FIG. 4).

Figure 3:
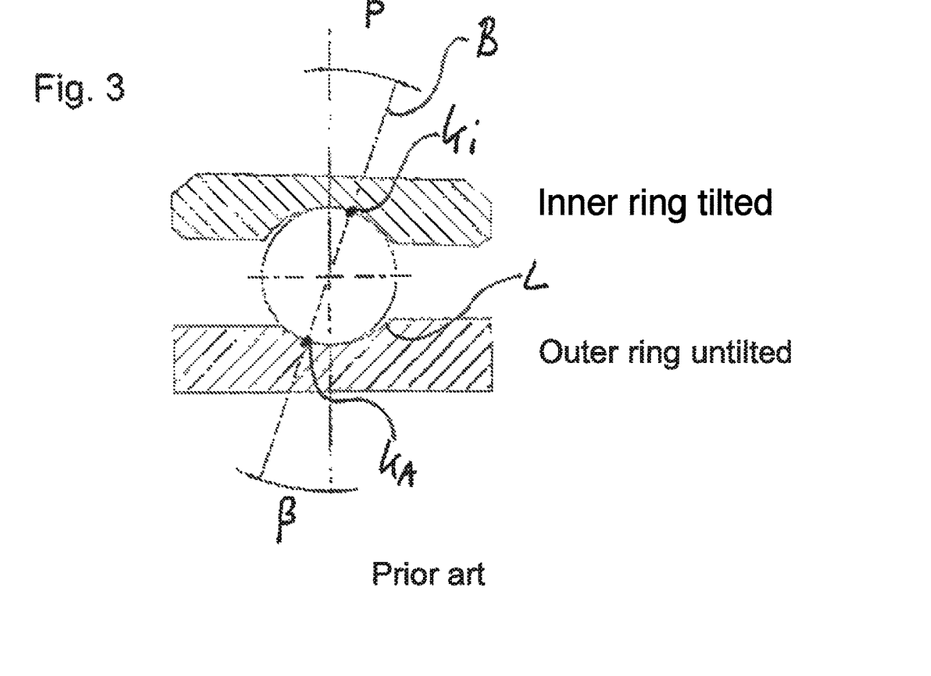
FIG. 3 shows a cross section through a ball bearing according to the prior art when the inner ring is tilted.
Figure 4:
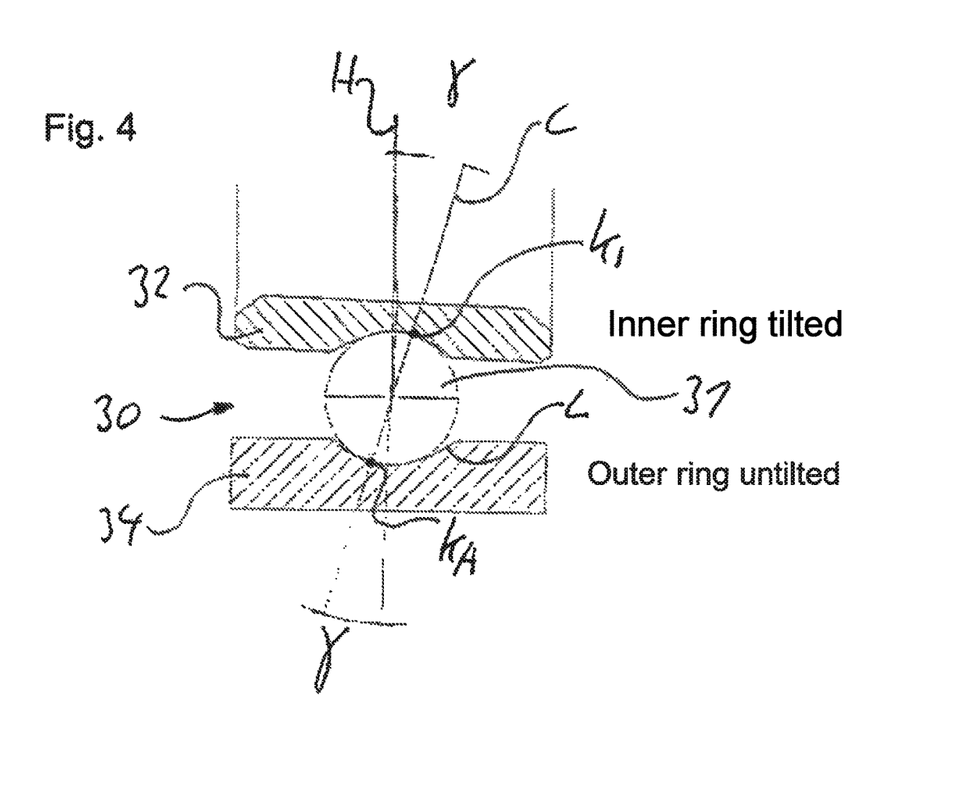
FIG. 4 shows a cross section through a ball bearing according to the invention when the inner ring is tilted.

A relative tilting between the inner and outer rings of a ball bearing is shown in FIG. 3, on the basis of a tilting of the inner ring with respect to the outer ring. Although FIG. 3 shows the tilting on the basis of a radial deep groove ball bearing, a corresponding angular ball bearing may have the same tilt. The designations of FIGS. 2a to 2c are adopted, since otherwise the cross section shown does not differ from the cross section of FIGS. 2a to 2c. Such a relative tilting, however, results in an elliptical raceway of the balls that is excessively wearing the ball bearing during operation, which can also be called an elliptical path, regardless of which pressure angle is present. The balls therefore no longer run on the circular path during operation, but on an elliptical path, which cause corresponding undesired accelerations and decelerations of the balls during operation of the ball bearing.

Due to the tilting, the contact points $K_I$ and $K_A$ are additionally displaced towards an angle $\beta$, which, when seen from the axis H, is greater than the pressure angle $\alpha$. The angle $\beta$ is approximately the same on the inner ring and on the outer ring. This larger angle $\beta$ will be referred to as the contact angle below.

The greater the contact angle $\beta$ with respect to the horizontal axis H, the more the shape of the elliptical path changes, since when the contact angle increases, referred to as $\beta$ in FIG. 3, the foci of the resulting ellipse diverge further apart, the ellipse thus assumes a narrower or elongated shape.

As in the ball bearings according to FIGS. 2a to 2c, in the embodiment according to FIG. 3, the contact point $K_A$ on the outer ring 34 and the contact point $K_I$ on the inner ring 32 are displaced away from the axis H to an axis B. In the case of the tilting of the inner ring relative to the outer ring shown in FIG. 3, there results a contact angle $\beta$ by which the contact points $K_A$ on the outer ring and $K_I$ on the inner ring move away from the axis H in the raceways L, which due to the tilting, as a rule, is larger than the pressure angle $\alpha$ of FIG. 2 when the inner ring and the outer ring are non-tilted with respect to one another. Consequently, in the event of a tilting of the inner ring to the outer ring, not only the described wear-generating elliptical path, but also a larger contact angle $\beta$ of the contact points $K_A$ and $K_I$ results.

A relative tilting between the inner and outer rings of a ball bearing, as shown in FIG. 3, is also shown in FIG. 4, again by way of example only on the basis of a tilting of the inner ring to the outer ring. FIG. 4 corresponds to the embodiment of FIG. 3, wherein in FIG. 4 the outer ring is now configured according to the invention (as will be explained in more detail with reference to the following FIG. 5). The inner ring remains unchanged and is thus identical to the inner ring shown in FIGS. 2 and 3.

Therefore, the contact points are $K_I$ and $K_A$ again, which due to the change in the raceway L of the outer ring 34 according to the invention now move less far away from the axis H than is the case in FIG. 3. It is understood that a comparison between the embodiments of FIGS. 2 to 4 is only possible if the ball bearings shown there have identical dimensions.

It becomes clear from FIG. 4 that the contact angle with respect to the axis H, here designated with $\gamma$, and thus the offset of the contact points $K_I$ and $K_A$, which are now located on the axis C, is considerably smaller than in the prior art according to FIG. 3. The angle $\gamma$ is approximately the same on the inner ring and on the outer ring. Due to the considerably smaller contact angle $\gamma$ relative to that according to the prior art, the shape of the ellipse established during operation of the ball bearing is substantially reduced with regard to the rolling of the balls 31, because the distance between the foci of the ellipse is considerably reduced at a smaller contact angle $\gamma$, so that the occurring accelerations and decelerations of the balls 31 within the ball bearing 30 are considerably reduced. This results in lower vibrations of the ball bearing 30 and, in addition, the service life of the ball bearing 30 is considerably increased even in the case of insufficient lubrication.

Test bench trials were carried out with a radial groove ball bearing according to the prior art, as shown in FIG. 3, and with a radial deep groove ball bearing according to the invention, as shown in FIG. 4. Here, the results of the model calculation explained above were confirmed. It has been shown in particular that in the event of a relative tilting of the outer ring relative to the inner ring, the ball bearing according to the invention has a considerably longer service life.

The inventive design of the raceway L of the outer ring 34 of the ball bearing 30 will now be explained in more detail with reference to FIG. 5. At this point, it should be noted once again that the raceway L of the inner ring (not shown) is not changed, i.e. it is formed with a constant curvature or constant circular arc as usual and known, when seen in cross section.

Figure 5:
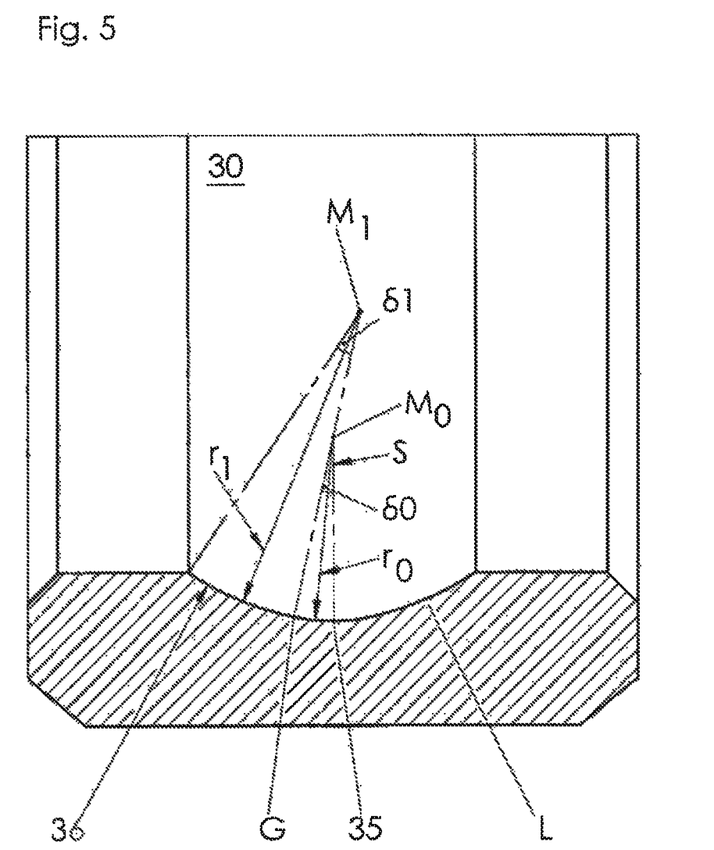
FIG. 5 shows a cross section through the outer ring according to the invention of a ball bearing installed in the dental piece of FIG. 1.

In contrast to the previously known embodiments of the raceways in the outer rings of a radial deep groove ball bearing or angular ball bearing, in the raceway L of the outer ring 34 according to the invention, a first radius or radius of curvature $r_0$, which, as usual and known, is slightly larger than the radius of the balls 31, only extends over an angle or angular range $\delta 0$ (which can also be referred to as the first raceway angle $\delta 0$), which is approximately 8° to approximately 15°, i.e. not over the entire cross section of the raceway L, i.e. not as far as the end thereof, as is illustrated in FIG. 5. When seen in cross section, the angle $\delta 0$ extends from the lowest point of the raceway L to a boundary point G. Due to the symmetry of the outer ring 34 shown in the cross section in FIG. 5, only the half extending to the left from the axis of symmetry S in FIG. 5 is to be explained, because the half extending to the right from the axis of symmetry in FIG. 5 has an identical design. In the case of the angular ball bearing, the raceway L, seen in cross section from the axis of symmetry S, in principle only extends to one side, as is known, while the raceway L on the opposite side of the axis of symmetry S ends just behind the lowest point, i.e., seen in cross-section, shortly behind the axis of symmetry S.

From the boundary point G to up to the end of the raceway L, the first radius of curvature $r_0$ transitions into a larger second radius or radius of curvature $r_1$, to be precise up to the end of the raceway L. The radius of curvature $r_1$ extends over a second angular range $\delta 1$ (which can be referred to as the second raceway angle $\delta 1$) and is approximately 50% to approximately 100% larger than the first radius or radius of curvature $r_0$. Preferably, $r_1$ is approximately 70% to approximately 80% larger than $r_0$.

A tangent applied to the first radius of curvature $r_0$, at the boundary point G, is to be congruent with or is to have the same slope as a tangent applied to the second radius of curvature $r_1$ likewise at the boundary point G, so that there is a smooth transition between the two different radii $r_0$ and $r_1$. Therefore, the center point $M_1$ of the second radius of curvature $r_1$ is offset relative to the center point $M_0$ of the first radius of curvature $r_0$ both in the vertical direction (in FIG. 5 in the direction of the axis of symmetry S) and in the horizontal direction (in FIG. 5 in the direction of the rotation axis (not shown) of the ball bearing 30), as is shown in FIG. 5.

The contact point $K_A$ (see FIG. 4), which is not illustrated in FIG. 5, on the outer ring 34, in the case of a mutual tilting of the inner ring to the outer ring, is located in the area of the larger second radius of curvature $r_1$ or in the area of the second curvature 36.

Due to the design of the outer ring 34 of the ball bearing 30 (single-row radial deep groove ball bearing or angular ball bearing) according to the invention, at high rotational speeds such as occur in the dental handpiece, the vibrations generated by the ball bearing upon tilting of the inner ring relative to the outer ring are prevented, at least reduced to a very great extent. As a result, the ball bearing 30 can have a substantially higher service life even in the case of insufficient lubrication, as has been possible to date, so that failure probabilities are minimized. Possibly remaining vibrations can be damped via the floating or elastic installation mounting by means of the elastic elements 40 and the wave spring washers 50 (see FIG. 1) in order not to be transmitted to the handle 12 of the dental handpiece.

By forming the outer ring 34 with the second curvature 36, which has the second radius $r_1$, following the first curvature 35, which has the first radius $r_0$, the contact points $K_A$ on the outer ring 34 and $K_I$ on the inner ring (not shown) are displaced less far away from the axis of symmetry S, so that the distance between the foci of the ellipse established by the tilting are reduced, which can therefore be approximated to a circular path easier compared to the prior art. Consequently, considerably lower accelerations and decelerations of the balls 31 occur during the operation of the ball bearing 30.

It is to be noted again that the inner ring (not shown) has a constant curvature, seen in cross section, that does not change over the entire length of the raceway L, which in the present case corresponds to the first radius of curvature $r_0$ of the outer ring 34, so that precise axial guidance of the balls 31 is ensured. Only the outer ring, seen in cross section, has at its raceway base the first curvature 35 with the smaller first radius $r_0$ and subsequently, starting from the boundary point G, a second curvature 36 having a larger second radius $r_1$.

Although the exemplary embodiment describes the raceway L with the first curvature 35 and the second curvature 36, the same effects can be achieved with a raceway that, seen in cross section, is substantially parabolic.

LIST OF REFERENCE NUMERALS

10 Housing
12 Handle
14 Chuck
16 Turbine wheel
18 Rotor shaft
20 Dental tool
30 Ball bearing
31 Ball
32 Inner ring
33 Ball bearing cage
34 Outer ring
35 First curvature
36 Second curvature
40 Elastic element (O-ring)
50 Wave spring washer
A Axis
G Boundary point
H Axis
$K_A$ Contact point on the outer ring
$K_I$ Contact point on the inner ring
L Raceway
$r_0$ First radius
$r_1$ Second radius
α Angle/pressure angle
β Angle/contact angle
γ Angle/contact angle
δ0 First angular range/first raceway angle
δ1 Second angular range/second raceway angle
S Axis of symmetry
$M_0$ Center
$M_1$ Center

The invention claimed is:

1. A ball bearing, comprising:
an inner ring, the inner ring having an inner raceway;
an outer ring, the outer ring having an outer raceway; and
a plurality of balls arranged between and guided by the inner and outer raceways, wherein:
the inner raceway of the inner ring, in cross section, has a concave profile with a curvature having a radius that substantially corresponds to a radius of the balls, the outer raceway of the outer ring, in cross section, has a central area having a first curvature having a first radius and an area adjoining the central area having a second curvature having a second radius, and the second radius is from about 50% to about 100% larger than the first radius.

2. The ball bearing according to claim 1, wherein a tangent to the first curvature at a boundary point between the first curvature and the second curvature is congruent with or has a slope mutually identical to a tangent to the second curvature at the boundary point.

3. The ball bearing according to claim 2, wherein the first curvature extends over an angular range of from about 8° to about 15°.

4. The ball bearing according to claim 1, wherein the ball bearing is for a floating installation.

5. The ball bearing according to claim 1, wherein the first curvature extends over an angular range of from about 8° to about 15°.

\* \* \* \* \*